INVENTOR.
R.L. BANKS
BY *Young & Quigg*
ATTORNEYS

United States Patent Office 3,431,316
Patented Mar. 4, 1969

3,431,316
CONVERSION OF OLEFINS
Robert L. Banks, Bartlesville, Okla., assignor to Phillips
Petroleum Company, a corporation of Delaware
Filed Jan. 4, 1965, Ser. No. 423,205
U.S. Cl. 260—683
Int. Cl. C07c 3/28; C10g 9/00
6 Claims

ABSTRACT OF THE DISCLOSURE

Ethylene is converted to propylene by contact with a tungsten oxide or molybdenum oxide promoted silica catalyst. The conversion of ethylene to propylene can be used in combination with disproportionation to treat ethylene and propylene by-products produced in cracking naphtha to produce butene, or such products produced in producing butene from propylene by dehydrogenation and disproportionation.

---

Figure 1:
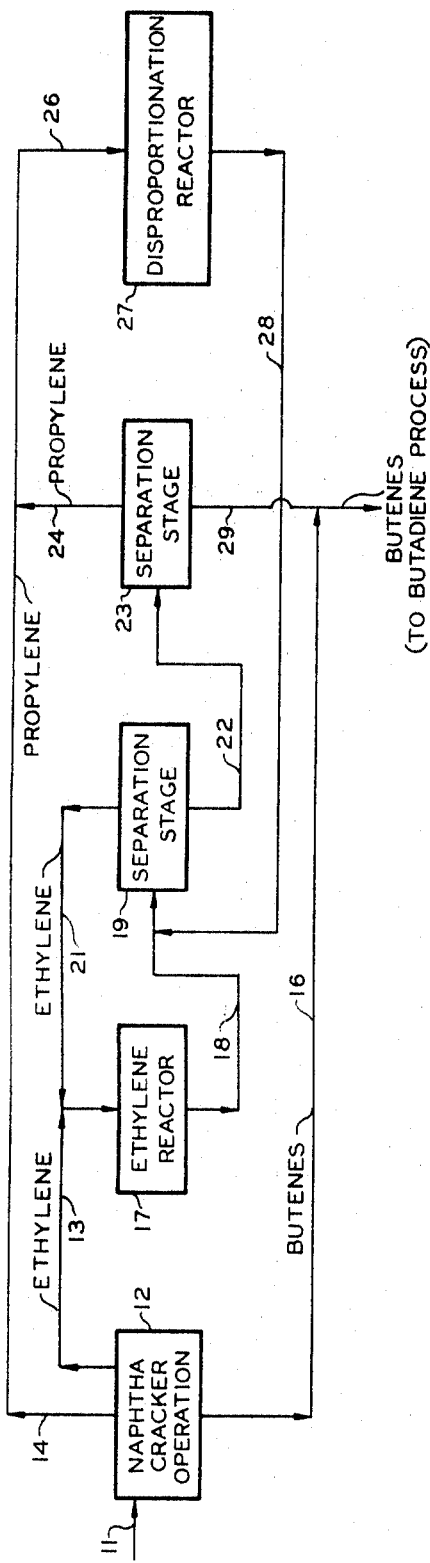

My invention relates to the conversion of olefins. In one aspect, my invention relates to the conversion of ethylene to propylene by contacting ethylene with a tungsten oxide or molybdenum oxide promoted silica catalyst. In another aspect, my invention relates to the production of butenes from naphtha with a minimum production of by-products. In another aspect, my invention relates to the production of butenes from propane.

The value of a hydrocarbon material depends in part upon its availability and demand. It is desirable to convert ethylene for which there may be in some circumstances a large supply in comparison with demand, to other hydrocarbons which may be in short supply and, therefore, more valuable. Propane is a hydrocarbon which often is available in abundance. It is desirable to convert propane to a product for which there is greater demand. In the cracking of naphtha to produce butenes for dehydrogenation to butadiene, the naphtha cracking operation produces not only the desired butenes, but also substantial quantities of ethylene and propylene. Often the yield of ethylene and propylene is in excess of the demand or of the ability to dispose of the by-products conveniently. For other reasons, for example, a local use for the other product, it sometimes is desirable to convert one product to another.

An object of my invention is to produce propylene from ethylene. Another object of my invention is to substantially eliminate ethylene and propylene as by-products in the conversion of naphtha to butadiene. Another object of my invention is to convert propane to butenes. Other aspects, objects and the advantages of my invention are apparent in the written description, the drawing and the claims.

According to my invention, ethylene is converted to propylene by contact with a tungsten oxide or molybdenum oxide promoted silica catalyst. The catalyst comprises silica which has been promoted with from about 0.1 to about 30 weight percent of tungsten oxide, molybdenum oxide, or mixtures thereof. Preferably the catalyst contains from about 1 to about 20 weight percent of the promoter and excellent results are obtained with 2 to 4 weight percent of the promoted oxide.

The silica can be any conventional catalytic grade material, including for example, precipitated silica gel, microspheroidal silica, flame-hydrolyzed silica, aerogel silica, and the like. These materials can be utilized in a wide variety of physical forms ranging from fine powders, for example, to coarse granules or pelleted shapes of various sizes.

The metal oxide promoter can be incorporated with the silica in a suitable manner, such as dry mixing, coprecipitation, or impregnation, using a promoter oxide or a compound convertible to the promoter oxide, or combinations. The form of the finished catalyst also can vary widely. Fine powders, granules, agglomerates, pellets, extrudates, and the like, are suitable, and are utilized depending upon the contacting technique selected for the hydrocarbon conversion. Before use in the process, the catalyst is given an activation by heat treatment such as, for example, by exposure to flowing air at 800–1500° F. for a time sufficient to place the catalyst in active condition. A similar treatment is used for regeneration.

The ethylene and catalyst are contacted either batchwise or continuously, using a fixed or mobile catalyst bed, a fluidized catalyst chamber, or other suitable contacting techniques, either in the presence or absence of a diluent. The process can be carried out at temperatures in the range of about 600 to about 1100° F., preferably 800 to about 1000° F., and at pressures of about 0 to about 1500 p.s.i.g., preferably 0–500 p.s.i.g. In continuous operation, a gaseous space velocity in the range of 6 to about 10,000 vol./vol./hr., or higher, can be used. If desired, paraffinic and cycloparaffinic hydrocarbons having up to 12 carbon atoms per molecule can be employed as diluents for the reaction.

Conventional methods are used to separate the hydrocarbon phase from the catalyst phase and to recover the products. Such techniques as fractional distillation, solvent extraction, absorption, and the like, can be employed for the separation of products. Unconverted ethylene and the diluents can be recycled.

Further according to my invention, butene is produced from naphtha by cracking the naphtha to produce ethylene, propylene and butene, converting the ethylene to additional propylene in an ethylene conversion zone, disproportionating the propylene and the additional propylene to produce additional ethylene and additional butene, and recycling the additional ethylene to the ethylene conversion zone. The ethylene conversion preferably is carried out using a tungsten oxide or molybdenum oxide promoted silica gel catalyst. Further according to my invention, butene is produced from naphtha by cracking the naphtha to produce ethylene, propylene and butene, and contacting the ethylene and propylene with a silica supported tungsten oxide or molybdenum oxide catalyst in a single reactor, thus producing additional butene, and continuously recycling ethylene and propylene to the ethylene-propylene reactor.

Further according to my invention, butene is produced from propane by dehydrogenation and disproportionation, followed by conversion of produced ethylene to additional propylene, with concurrent disproportionation of combined propylene to yield additional butene. The dehydrogenation and disproportionation of propane is carried out according to the method of copending application Ser. No. 423,206, L. F. Heckelsberg and R. L. Banks, filed Jan. 4, 1965, entitled Combined Dehydrogenation and Disproportionation.

Further according to my invention, butene is produced from propane by dehydrogenation and disproportionation, followed by conversion of produced ethylene to additional butene. In the combined dehydrogenation and disproportionation, the catalysts can be those which are active at temperatures of about 800° F. or higher. For the dehydrogenation, some examples of suitable catalysts include alumina catalysts which are promoted by oxides or other compounds of platinum, iron, potassium, sodium, chromium, molybdenum, tungsten, uranium, berryllium, magnesium copper calcium and thorium, or combinations thereof. Chromium oxide supported on alumina and also containing sodium oxide is a preferred dehydrogenation catalyst. The disproportionation catalysts include silica based catalysts containing about 9 weight percent tungsten oxide and other catalysts such as those disclosed and claimed in copending application Ser. No. 307,371, Heckelsberg, filed Sept. 9, 1963, now abandoned. Preferably, the disproportionation promoter is selected from the group consisting of tungsten oxide and molybdenum oxide. The conditions are selected so that appreciable amounts of both dehydrogenation and disproportionation are obtained. The process can be carried out at temperatures from about 800–1200° F. and at pressures of 0–1500 p.s.i.g.

Figure 2:
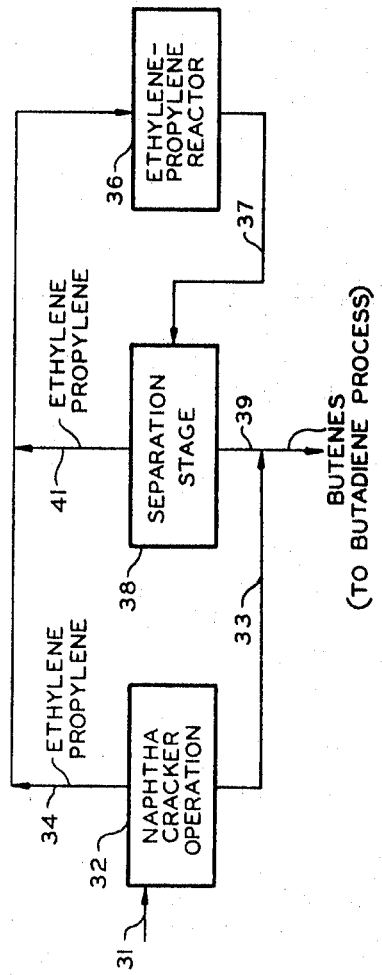
Figure 3:
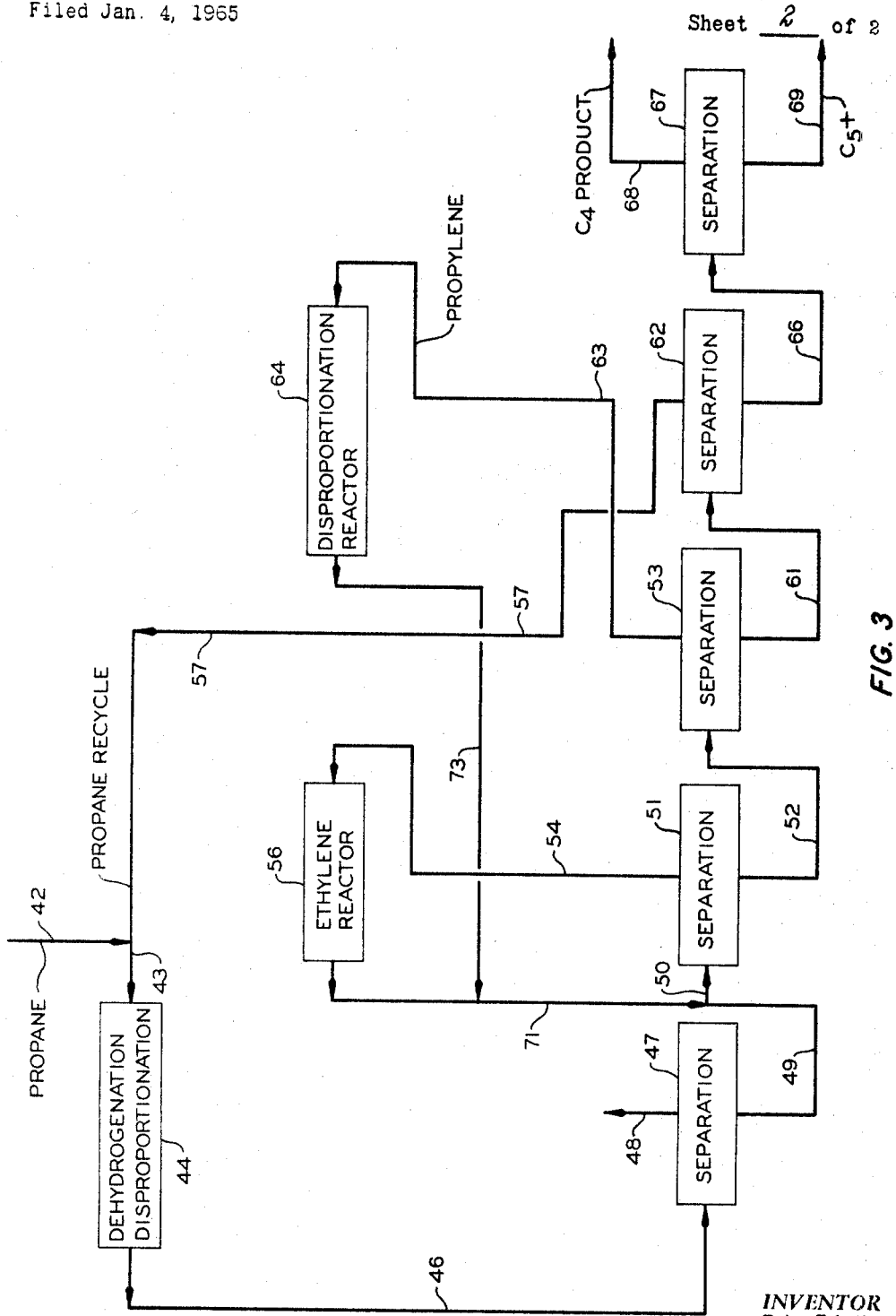

In the drawings, FIGURE 1 illustrates the production of butene from naphtha by cracking the naphtha and utilizing an ethylene conversion zone to convert ethylene to propylene and the disproportionation zone to convert propylene to ethylene and butene. FIGURE 2 illustrates the production of butene from naphtha by cracking the naphtha and continuously passing all of the ethylene and propylene of the process through a single reactor in contact with a silica supported tungsten oxide or molybdenum oxide catalyst, thus producing additional butene. FIGURE 3 illustrates the production of butenes from propane.

In FIGURE 1, naphtha is fed to the naphtha cracking operation through feed conduit 11. The naphtha cracking operation, indicated by the box 12, schematically represents the naphtha cracking per se as well as separation steps following the cracking to produce separate streams comprising ethylene, propylene and butene in pipes 13, 14 and 16, respectively. The ethylene from the naptha cracking operation is passed into ethylene reactor 17 and the effluent from reactor 17 is passed through pipe 18 into separation stage 19. Separation stage 19 removes the ethylene which is recycled through pipe 21 to reactor 17 while the bottoms product, comprising propylene and butenes, is passed through pipe 22 into separation stage 23. In separation stage 23, propylene is taken overhead through pipe 24, combined with the propylene in pipe 14 and passed through pipe 26 into disproportionation reactor 27. The effluent from reactor 27, comrising ethylene, propylene and butenes, is passed through pipe 28 and flowed into the extreme end of pipe 18 to be fed into separation stage 19. The butene in pipe 16 is combined with butene in pipe 29 from separation stage 23 for recovery of the butene product. This product stream is suitable for feeding to a butadiene process, for example.

In FIGURE 2, naphtha feed enters through pipe 31 to naphtha cracking operation 32. Again, the naphtha cracking operation 32 is represented schematically and includes both the cracking reactor and necessary separation facilities to produce a stream in pipe 33 comprising butenes and a stream in pipe 34 comprising ethylene and propylene. The ethylene and propylene in pipe 34 are fed into ethylene-propylene reactor 36 wherein they are contacted with a silica supported tungsten oxide or molybdenum oxide catalyst which thereby disproportionates the propylene to produce ethylene and butenes and simultaneously converts ethylene to butene. The effluent from reactor 36 comprising ethylene, propylene and butenes is passed through pipe 37 into separation stage 38. Butenes are removed through pipe 39 and combined with the butenes in pipe 33 as butene product, while the ethylene and propylene are recycled through pipe 41 to pipe 34 to be returned to reactor 36.

In FIGURE 3, a stream comprising propane is fed through pipe 42 and pipe 43 into dehydrogenation-disproportionation unit 44. The effluent from unit 44, comprising ethylene, propylene, and butene, in addition to unreacted propane and other hydrocarbons, is fed through pipe 46 into the first stage separation 47. From separation stage 47 lighter by-products such as for example hydrogen, methane and ethane are removed by removal means indicated schematically by the pipe 48. The remainder of the stream comprising substantially all of the ethylene and butene is fed through pipe 49 and pipe 50 into second stage separation unit 51. Propylene, propane and heavier are passed through pipe 52 into third stage separation unit 53. The overhead from separation unit 51, comprising ethylene, is fed through pipe 54 into ethylene reactor 56. Propylene, removed from separation unit 53 is fed through pipe 63 back to disproportiontion unit 64 as shown. The remainder of the stream comprising substantially all of the propane and butenes is fed through pipe 61 into fourth stage separation unit 62. Propane is removed through pipe 57 and fed to dehydrogenation-disproportionation reactor 44. Butene and heavier is removed through pipes 66 and fed to fifth stage separation unit 67 by which a $C_4$ product, comprising butene, is removed through pipe 68 while the $C_5$ and heavier fraction is removed through pipe 69. In ethylene reactor 56 ethylene is converted to propylene and/or butene and fed through pipe 71 and pipe 50 into second stage separation unit 51. In disproportionation reactor 64, propylene is converted to ethylene and butene and the effluent fed through pipe 73 into pipe 71 from which it enters into the separation train.

Throughout the disclosure, it will be recognized that the drawings are schematic and that many items of equipment useful or necessary in the operation of a commercial plant have been omitted for purposes of clarity. For example, additional pumps, valves, heaters, separation steps, controls, etc., can be supplied readily by one skilled in the art. In each of the separation steps disclosed, any type of separation suitable for that particular step can be utilized, including for example, fractional distillation, adsorption, etc.

It will be understood that it is not essential that all the by-product ethylene and propylene need be consumed in the preparation of butene. Only that portion of these materials which is in excess of that required for normal demand can be so treated. The present invention, therefore, provides a flexibility to meet changing requirements.

The naphtha cracking operation according to the present invention can be any suitable process, either thermal or catalytic, and provides a variety of useful products which range from lower molecular weight olefins to hydrocarbon mixtures suitable for fuel oils, fuel gas and gasolines, as is well known. Additional separation for the recovery of products is not shown but can be supplied readily by one skilled in the art.

The disproportionation step can be carried out by any suitable process including, for example, the process disclosed in copending application Ser. No. 307,371, Heckelsberg, filed Sept. 9, 1963 now abandoned, or Ser. No. 312,209, to the present inventor, filed Sept. 27, 1963, now Patent No. 3,261,879. Where the combined propylene disproportionation and ethylene conversion according to FIGURE 2 is used the catalyst of said Ser. No. 307,371 is suitable.

The invention is further illustrated by the following examples.

EXAMPLE I 5 parts by weight of a 20–40 mesh catalyst which contained about 3 weight percent tungsten oxide and the remainder silica, was loaded into a stainless steel reactor tube. The catalyst was then activated for three hours at 1100° F. in flowing dry air while within the reactor. After activation, the reactor was flushed with nitrogen.

At a temperature of 820° F., a pressure of 450 p.s.i.g., and a gaseous hourly space rate of 3600 v./v./hr., ethylene was passed into the reactor to contact the catalyst bed. The ethylene flow was allowed to continue for about two hours during which time the reactor effluent was intermittently sampled for chromatographic analysis. Based on the chromatographic analysis of the effluent the conversion of ethylene was computed to be about 27 percent. The products were a mixture containing about 85 weight percent propylene, about 10 weight percent butenes, and about 5 weight percent hydrocarbons heavier than $C_4$.

The above run illustrates that ethylene is efficiently converted to propylene using the process of this invention.

EXAMPLE II

The following table contains conditions of operation illustrating the embodiment shown in FIGURE 1.

Naphtha cracking operation 1500 to 1550° F.
10 p.s.i.g. outlet pressure
About 1 second residence time
Naphtha-to-steam ratio of 0.7 to 1.3
Conversion to butenes and lighter of about 65 percent.

Ethylene reactor

820° F.
450 p.s.i.g.
3600 space velocity (v./v./hr.)
8 percent $WO_3$–92 percent $SiO_2$ catalyst

Disproportionation reactor

800° F.
400 p.s.i.g.
30 weight hourly space velocity
8 percent $WO_3$–92 percent $SiO_2$ catalyst The following table contains a material balance illustrating the operation of the embodiment of FIGURE 1 using the above conditions. Using, as a basis, 1000 pounds of naphtha to the cracking unit, ethylene 1 and propylene 8 are obtained from the cracker and processed as shown. The table contains the pertinent materials content of the streams involved whose numbers refer to FIGURE 1.

| Stream | (1) | (2) | (3) | (4) | (5) | (6) | (7) | (8) |
|---|---|---|---|---|---|---|---|---|
|  | 13 | 21 | 18 | 28 | 22 | 24 | 29 | 26 |
| Ethylene | 198 | 1,254 | 1,084 | 170 | | | | |
| Propylene | | | 368 | 621 | 989 | 989 | | 141 |
| Butenes | | | | 339 | 339 | | 339 | |
| Total | 198 | 1,254 | 1,452 | 1,130 | 1,328 | 989 | 339 | 141 |

From examination of the above table, it is seen that both ethylene and propylene are conveniently and efficiently utilized in the preparation of butenes intended for the production of the butadiene.

Example III

In an operation according to the embodiment of FIGURE 2, conditions of the naphtha cracking operation are the same as in Example II above while the conditions of operation of the ethylene-propylene reactor are:

800° F.
450 p.s.i.g.
20 weight hourly space velocity
8 percent $WO_3$–92 percent $SiO_2$ catalyst.

Under these operating conditions, the following material balance is obtained:

| Stream | (34) | (41) | (37) | (39) |
|---|---|---|---|---|
| Ethylene | 198 | 605 | 605 | |
| Propylene | 142 | 1,145 | 1,148 | 3 |
| Butenes | | | 320 | 320 |
| $C_5^+$ | | | 17 | |
| Total | 340 | 1,750 | 2,090 | 323 |

EXAMPLE IV

In an operation according to the embodiment of FIGURE 3, the conditions of operation of the ethylene reactor and the disproportionation reactor are the same as in Example II above while the dehydrogenation-disproportionation reactor is operated under the following conditions:

1040° F.
20 p.s.i.g.
200 v./v./hr.
5 parts chromia-alumina catalyst (by volume)
1 part tungsten oxide-silica-alumina catalyst (by volume)

Under these conditions, the following material balance is obtained:

[Basis: 1,000 pounds propane feed]

| | $H_2$ | (42) | (43) | (46) | (48a) | (48b) | (49) | (50) | (52) |
|---|---|---|---|---|---|---|---|---|---|
| $CH_4$ | | | | 58 | 58 | | | | |
| $C_2^=$ | | | | 105 | 3 | 2 | 100 | 1,132 | 4 |
| $C_2$ | | 2 | 2 | 200 | 2 | 198 | | | |
| $C_3^=$ | | 15 | 25 | 340 | | 2 | 338 | 1,398 | 1,386 |
| $C_4^=$ | | 3 | 7 | 112 | | | 112 | 522 | 522 |
| $C_4$ | | | | 90 | | | 90 | 95 | 95 |
| $C_5^+$ | | | | 94 | | | 94 | 132 | 132 |
| Total | 1,000 | 2,014 | 2,014 | 63 | 202 | 1,749 | 4,314 | 3,169 |

| | $H_2$ | (54) | (57) | (61) | (63) | (66) | (68) | (69) | (71) | (73) |
|---|---|---|---|---|---|---|---|---|---|---|
| $CH_4$ | | | | | | | | | | |
| $C_2^=$ | | 1,128 | | | 4 | | | | 1,032 | 196 |
| $C_2$ | | | | | | | | | | |
| $C_3^=$ | | 12 | 10 | 10 | 1,376 | | | | 1,060 | 800 |
| $C_3$ | | 5 | 1,000 | 1,015 | 15 | 15 | 15 | | 20 | 15 |
| $C_4^=$ | | | 4 | 512 | 10 | 508 | 508 | | 410 | 376 |
| $C_4$ | | | | 95 | | 95 | 95 | | 5 | 5 |
| $C_5^+$ | | | | 132 | | 132 | | 132 | 38 | 28 |
| Total | 1,145 | 1,014 | 1,764 | 1,405 | 750 | 618 | 132 | 2,565 | 1,420 |

Reasonable variation and modification are possible within the scope of my invention which sets forth a method for converting ethylene to propylene and for producing butene by cracking naphtha while controlling the production of ethylene and propylene by-products.

I claim:

1. A process which comprises converting ethylene to propylene by contacting ethylene with a catalyst active for converting ethylene to propylene comprising silica and at least one oxide selected from the group consisting of molybdenum oxide and tungsten oxide, under conditions, including conditions of temperature within the range of 600–1100° F., pressure and contact time, suitable for obtaining a propylene product.

2. A process for converting ethylene to propylene, which comprises contacting ethylene with a catalyst consisting essentially of a silica base and a promoter selected from the group consisting of molybdenum oxide and tungsten oxide under conditions of temperature, pressure and contact time, suitable for obtaining a propylene product, within a temperature range of 600 to 1100° F. and a pressure range of 0–1500 p.s.i.g.

3. The process of claim 2 wherein said temperature range is 800–1000° F. and said pressure range is 0–500 p.s.i.g.

4. A process for producing butene from naphtha, which comprises:
   cracking naphtha to produce ethylene, propylene and butene;
   converting said ethylene to additional propylene in an ethylene conversion zone by contacting ethylene with a catalyst active for converting ethylene to propylene comprising silica and at least one oxide selected from the group consisting of molybdenum oxide and tungsten oxide under conditions, including conditions of temperature within the range of 600–1100° F., pressure and contact time, suitable for obtaining a propylene product;
   disproportionating said propylene and said additional propylene to produce additional ethylene and additional butene; an
   recycling said additional ethylene to said ethylene conversion zone.

5. A process for producing butene from propane, comprising the steps of:
   feeding a stream containing propane into a propane conversion unit and therein dehydrogenating and disproportionating propane to produce a stream containing ethylene, propylene and butenes;
   feeding said ethylene into an ethylene conversion zone wherein ethylene is converted to propylene by contacting ethylene with a catalyst active for converting ethylene to propylene comprising silica and at least one oxide selected from the group consisting of molybdenum oxide and tungsten oxide under conditions, including conditions of temperature within the range of 600–1100° F., pressure and contact time, suitable for obtaining a propylene product;

feeding propylene from said propane conversion zone and propylene from said ethylene conversion zone into a disproportionation zone, and therein converting propylene to ethylene and butenes;

feeding ethylene from said disproportionation zone into an ethylene conversion zone; and recovering said butenes.

6. A process for producing butene, which comprises:

cracking naphtha to produce ethylene, propylene and butenes;

passing said ethylene and propylene into an ethylene-propylene reactor for the production of additional butene;

utilizing in said reactor catalyst active for converting ethylene and propylene to produce butene comprising silica promoted by a compound selected from the group consisting of tungsten oxide and molybdenum oxide and maintaining in said reactor a temperature in the range of 600–1100° F.;

passing the effluent of said ethylene-propylene reactor into a separation zone; and recovering additional butene from said separation zone and recycling ethylene and propylene from said separation zone to said ethylene-propylene reactor.

References Cited

UNITED STATES PATENTS

| | | | |
|---|---|---|---|
| 2,389,780 | 11/1945 | Ipatieff et al. | 260—683.15 |
| 2,500,146 | 3/1950 | Fleck et al. | 260—683.3 |
| 2,825,721 | 3/1958 | Hogan et al. | 260—683.15 |
| 2,910,428 | 10/1959 | Thomas et al. | 260—683 |
| 3,261,879 | 7/1966 | Banks | 260—683 |

DELBERT E. GANTZ, *Primary Examiner.*

C. E. SPRESSER, *Assistant Examiner.*

U.S. Cl. X.R.

260—680, 683.15; 208—67, 70, 71